US011329495B2

(12) United States Patent
Yu et al.

(10) Patent No.: US 11,329,495 B2
(45) Date of Patent: May 10, 2022

(54) RECONFIGURABLE POWER ADAPTER FOR AN INFORMATION HANDLING SYSTEM

(71) Applicant: Dell Products L.P., Round Rock, TX (US)

(72) Inventors: Wei-Cheng Yu, New Taipei (TW); Tsung-Cheng Liao, Taoyuan (TW); Merle J. Wood, III, Round Rock, TX (US); WenYung Chang, Jhong Li (TW); Geroncio Tan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 193 days.

(21) Appl. No.: 16/267,568

(22) Filed: Feb. 5, 2019

(65) Prior Publication Data

US 2020/0251923 A1  Aug. 6, 2020

(51) Int. Cl.
*H02J 7/04* (2006.01)
*G06F 1/26* (2006.01)
*H01R 31/06* (2006.01)
*H02J 7/02* (2016.01)
*H02J 7/00* (2006.01)

(52) U.S. Cl.
CPC ........ *H02J 7/007192* (2020.01); *G06F 1/263* (2013.01); *H01R 31/065* (2013.01); *H02J 7/022* (2013.01)

(58) Field of Classification Search
CPC .... H02J 7/047; H02J 7/022; H02J 7/02; H02J 7/04; H02J 7/007192; G06F 1/26; G06F 1/263; H01R 31/06; H01R 31/065

USPC .......................................................... 320/150
See application file for complete search history.

(56) References Cited

U.S. PATENT DOCUMENTS

| 8,907,631 | B1* | 12/2014 | Gurries | ................. | H02J 7/0077 |
| | | | | | 320/138 |
| 9,197,132 | B2* | 11/2015 | Artusi | ................ | H02M 1/4225 |
| 2003/0098678 | A1* | 5/2003 | Haraguchi | .............. | H02M 1/36 |
| | | | | | 323/282 |
| 2004/0108837 | A1* | 6/2004 | Lai | ........................ | H02J 7/0071 |
| | | | | | 320/137 |
| 2007/0285074 | A1* | 12/2007 | Maekawa | ............. | H02M 3/157 |
| | | | | | 323/293 |
| 2009/0177906 | A1* | 7/2009 | Paniagua, Jr. | ............ | H02J 7/02 |
| | | | | | 713/340 |
| 2015/0036394 | A1* | 2/2015 | Yang | ................. | H02M 3/33507 |
| | | | | | 363/21.18 |

(Continued)

*Primary Examiner* — Richard Isla
*Assistant Examiner* — Dung V Bui
(74) *Attorney, Agent, or Firm* — Norton Rose Fulbright US LLP (57) ABSTRACT

A power adaptor for an information handling system may provide a higher power output level by monitoring a temperature inside a transformer of the power adaptor. When the transformer temperature is below a threshold below a rated temperature, the power adaptor may be allowed to operate at high power output levels. For example, a power adaptor rated for 45 Watts at 100 degrees Celsius may be allowed to operate at 65 Watts at 70 degrees Celsius. A feedback circuit may use transformer temperature information to determine when a power output level of the power adaptor may be adjusted to a higher level and then reconfigure the power adaptor to operate at the higher power output level.

16 Claims, 5 Drawing Sheets

(56) References Cited

U.S. PATENT DOCUMENTS

| | | | | |
|---|---|---|---|---|
| 2015/0346792 A1* | 12/2015 | Rathi | ............... | G05F 1/625 |
| | | | | 713/310 |
| 2016/0233714 A1* | 8/2016 | Lo | ............... | H02J 7/0091 |
| 2016/0286620 A1* | 9/2016 | Zhang | ............... | H05B 45/38 |
| 2016/0329483 A1* | 11/2016 | Bailey | ............... | A61B 5/055 |
| 2017/0085098 A1* | 3/2017 | Sporck | ............... | H02J 7/007 |
| 2018/0166205 A1* | 6/2018 | Whittle | ............... | H01F 27/36 |

\* cited by examiner

# RECONFIGURABLE POWER ADAPTER FOR AN INFORMATION HANDLING SYSTEM

FIELD OF THE DISCLOSURE

The instant disclosure relates to information handling system. More specifically, portions of this disclosure relate to power supplies for the information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
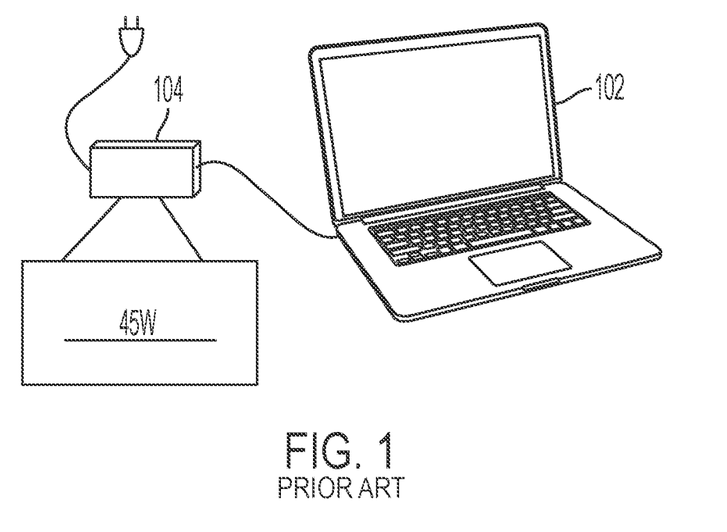
FIG. 1 is an illustration of a power adaptor for a laptop computer information handling system.

Information handling systems generally operate on direct current (DC) power, whereas the majority of the world's power infrastructure provides alternating current (AC) power. Thus, many information handling systems include power adaptors that convert the alternating current (AC) power to direct current (DC) power for operation of the information handling system. For example, laptop computers include external power adaptors that provide power for battery charging and laptop operation. However, information handling systems may alternatively include internal power adaptors that perform the same function. The components in the power adaptor have a limited power capacity, and the power adaptor is sized for the expected power demand from the information handling system. Power adaptors for larger power demands are larger and more expensive. Thus, power adaptors are sized as small as possible to satisfy the maximum power demand of the information handling system. FIG. 1 is an illustration of a power adaptor 104 for a laptop computer information handling system 102. The power adaptor 104 output capacity is 45 Watts, which is restricted by the components within the power adaptor 104. The maximum expected operating power for the information handling system 102 may also be 45 Watts. Excess available power when the information handling system 102 is not operating at full power can be used to charge a battery within the information handling system 102.

SUMMARY

Power adaptors are sized to match an expected load of the information handling system. As described with reference to FIG. 1, an information handling system 104 with a 45 Watt maximum demand is matched with a 45 Watt power adaptor 102. Although the power output limits of the power adaptor 102 are a result of components within the power adaptor 102, the power output limit also includes a margin of safety. The output capacity for the power adaptor varies as a function of temperature. At higher temperatures the output capacity of the power adaptor is lower than the output capacity of the same power adaptor at lower temperatures. That power limit is based on characteristics of the transformer in the power adaptor and the temperature. As temperature in the transformer increases the saturation level of magnetic flux in the transformer decreases, which reduces a maximum power output level. A power adaptor may be rated for 45 Watts at 100 degrees Celsius, but the same power adaptor may be capable of operating at 65 Watts when the temperature is only 40 degrees Celsius. Conventionally, the power output of the power adaptor is restricted to 45 Watts even though higher outputs may be possible at lower temperatures. Embodiments disclosed herein allow the power adaptor to operate at higher output powers when conditions are safe for such higher output powers. For example, a 45 Watt power adaptor may be reconfigured as a 65 Watt power adaptor when temperatures are low enough to allow safe operation at that higher power output level.

One embodiment for determining whether a power adaptor may be safely operated at a higher power output level is to determine a temperature of a transformer of the power adaptor. When the temperature is below a threshold level, the power adaptor may be reconfigured to operate at a high power output level. When the temperature exceeds the threshold level, the power adaptor may be reconfigured to operate at a normal power output level (e.g., the rated power output level of the power adaptor) that is lower than the high power output level. Reconfiguring the power adaptor may include toggling certain switches, such as transistors, within the power adaptor to change resistances in the power adaptor to change the output power level. When reconfiguring the power adaptor, a message may be broadcast to an information handling system coupled to the power adaptor to inform the information handling system of the new power adaptor source capability.

In some embodiments, when the transformer core temperature is below a threshold level, events may happen in series or in parallel, including resetting the PSID IC of the power adaptor to resend a series of SDQ messages with new source capability to the information handling system to inform the system of higher source capability, the power adaptor switching frequency ($F_{sw}$) may be increased, and the output power level may be increased to meet the higher source capability communicated to the system. After the transformer core temperature increases beyond the threshold level, the process may be reversed including, for example, resetting the PSID to inform the information handling system of the reduced power capability, reducing the power adaptor converter's switching frequency, and reducing the output power level to the new capability.

According to one embodiment, a method for operating a power adaptor may include determining a temperature of a power supply for an information handling system; determining whether the temperature is above a predetermined threshold; and when the temperature is not above the predetermined threshold, adjusting a power output level of the power supply to a first power output level higher than a second power output level.

According to another embodiment, an apparatus such as a power adaptor may include a controller configured to perform steps comprising determining a temperature of a power adaptor for an information handling system; determining whether the temperature is above a predetermined threshold; and when the temperature is not above the predetermined threshold, adjusting a power output level of the power adaptor to a first power output level higher than a second power output level.

According to a further embodiment of the disclosure, an apparatus, such as a power adaptor, may include an alternating current (AC)-to-direct current (DC) converting device comprising a transformer, a boost converter, and a DC-to-DC converter; a temperature detector attached to the transformer and configured to measure a temperature in the transformer; and a controller coupled to the AC-to-DC converting device and to the temperature detector, wherein the controller is configured to adjust a power output level of the AC-to-DC converting device based, at least in part, on the temperature in the transformer.

Although a power adaptor is described in embodiments of the disclosure as an alternating current (AC)-to-direct current (DC) power adaptor, the term power adaptor should be understood to include any power supply device that supplies power to an electronic device. For example, a power adaptor may also include alternating current (AC)-to-alternating current (AC) power adaptors and direct current (DC)-to-direct current (DC) power adaptors and other power conditioning or power generation devices such as generators or uninterruptable power supplies (UPSs). A power adaptor may be used with an information handling system or any other electronic device.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 2:
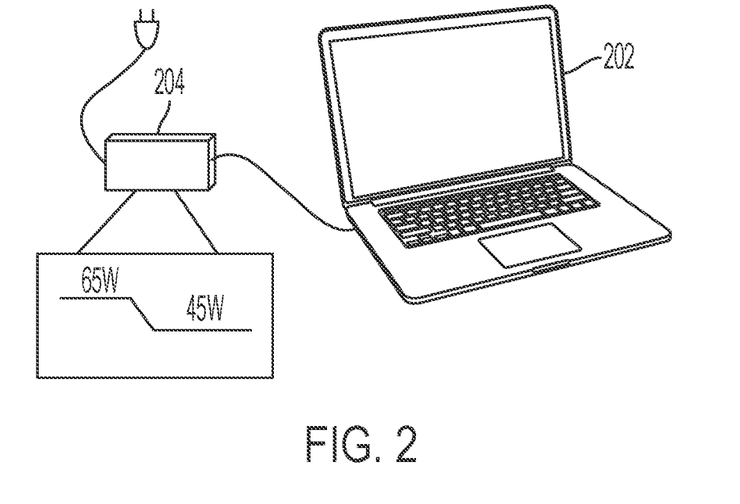
FIG. 2 is an illustration of a reconfigurable power adaptor for a laptop computer information handling system according to some embodiments of the disclosure.

FIG. 2 is an illustration of a reconfigurable power adaptor for a laptop computer information handling system according to some embodiments of the disclosure. A power adaptor 204 for an information handling system 202 may be reconfigurable to provide two different power output capacities. For example, the power adaptor 204 may have a rated power output of 45 Watts, but may be reconfigured in some operating conditions to operate at 65 Watts. The higher power output capacity of the power adaptor 204 may allow components within the information handling system 202 to operate at higher power levels. For example, additional circuitry, such as a graphics processing unit (GPU), of the information handling system 202 may be able to operate when the higher power output is available from the power adaptor 204. As another example, circuitry, such as a central processing unit (CPU), of the information handling system 202 may be able to operate at higher power levels, such as at faster operating frequencies, when the higher power output is available from the power adaptor 204. As a further example, a battery within the information handling system 202 may be charged with the excess power from the power adaptor 204 when operating at higher power levels that exceed an instantaneous power demand from the information handling system 202. The additional power may be used to charge the battery faster than when the power adaptor is operating at its rated power output level. That is, the power adaptor 204 operating at 65 Watts can charge the battery faster than when the power adaptor 204 is operating at its rated 45 Watts. The quicker battery charging is beneficial to users of the information handling system to provide longer operation of the information handling system 202 between charging opportunities. The benefit may be particularly useful for a traveling user who has a short period of time to charge the battery, such as a traveler between air flights or train rides.

The increased power output from the power adaptor above its rated power level provides the benefits of a larger, more expensive power adaptor in some operating conditions without having to increase the size and cost of the power adaptor. For example, a user that wants faster battery charging or the option to use additional circuitry, such as a GPU, is conventionally required to purchase a larger, more expensive power adaptor. However, reconfiguring the power adaptor according to aspects of the embodiments disclosed herein allows that user to take advantage of faster charging or operation of additional circuitry in some operating conditions without purchasing and carrying a larger, more expensive power adaptor.

The increased power output from the power adaptor can be realized when the temperature of a transformer in the power adaptor is lower than the temperature at which the power adaptor rating is based upon. For example, if the power adaptor rating of 45 Watts is determined at a 100 degrees Celsius internal transformer temperature, then a higher power output may be obtained at lower internal transformer temperatures. A low temperature transformer is able to support higher flux density saturation specification margin to deliver more power to an information handling system for a period of time. By monitoring the transformer internal temperature, more power can be transferred to the information handling system by taking advantage of the transformer thermal capacitance. For example, 45 W adaptor may be able to deliver 65 W output power for up to 15 minutes. The saturation magnetic flux, $B_{sat}$, for the transformer may vary 15% between 70 and 100 degrees Celsius. The higher $B_{sat}$ available at 70 degrees Celsius can provide headroom for the higher power output level. In some embodiments, converter switching frequency in the power adaptor can temporarily be increased to effectively reduce $\Delta B$ and provide for a further increase in power output level from the power adaptor.

Figure 3:
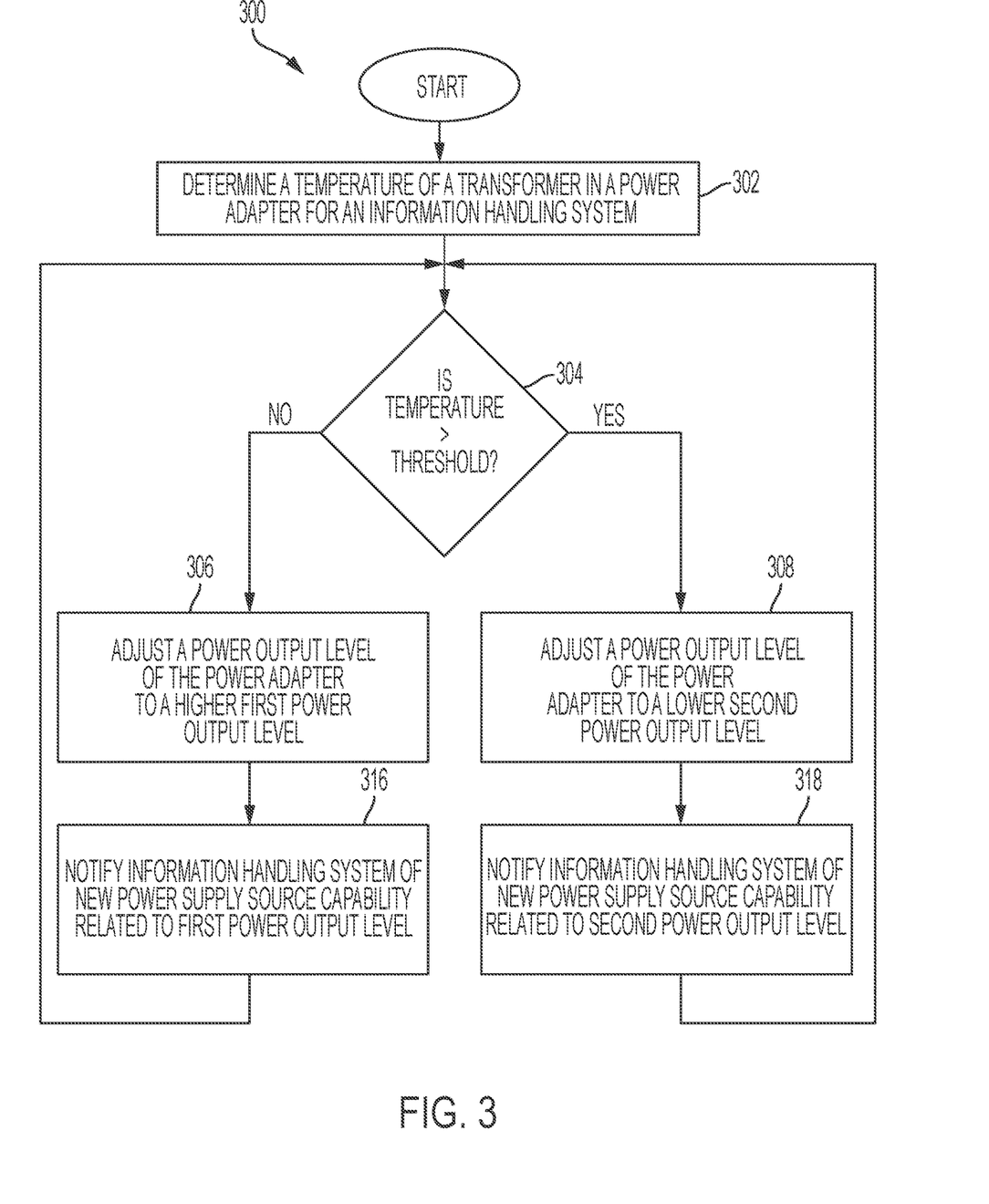
FIG. 3 is a flow chart illustrating a method of reconfiguring a power adaptor according to some embodiments of the disclosure.

Operation and reconfiguration of a power adaptor to obtain some of these benefits is shown in FIG. 3. FIG. 3 is a flow chart illustrating a method of reconfiguring a power adaptor according to some embodiments of the disclosure. A method 300 begins at block 302 with determining a temperature of a transformer in a power adaptor for an information handling system. At block 304 it is determined whether the transformer temperature at block 302 is above a threshold level. The threshold level may be set based on testing data and/or simulation data regarding safe output of the power adaptor. The threshold level may also include a safety margin to ensure that even at the increased power output level the power adaptor is still operated safely.

When the temperature is determined to be below the threshold, the method 300 continues to block 306 with adjusting a power output level of the power adaptor to a first power output level that is higher than may be higher than a rated power output of the power adaptor. Also, after determining that the temperature is below the threshold, the power adaptor may notify the information handling system of new power supply source capability related to the reconfigured first power output level. The notification of block 316 may be performed after adjusting the power output level at block 306 or in parallel with the adjustment of block 306. The notification may be sent over a dedicated communication link to the information handling system (e.g., a separate pin of a multi-pin connector), a shared or dedicated communication link to the information handling system (e.g., a WiFi or Bluetooth connection), and/or over the power connector that carries power to the information handling system from the power adaptor. In some embodiments, the notification may be sent as a message encoded on the power line to the information handling system. Such a notification technique may allow conventional connectors, such as USB Type-C and barrel connectors, to be used along with an adjustable power adaptor.

When the temperature is determined to be above the threshold, the method 300 continues to block 308 with adjusting a power output level of the power adaptor to a second power output level. The second power output level may be lower than the first power output level and may be equal to the rated power level of the power adaptor. Also, after determining that the temperature is above the threshold, the power adaptor may notify the information handling system at block 318 of a new power supply source capability related to the reconfigured second power output level. The notification of block 318 may be performed after adjusting the power output level at block 306 or in parallel with the adjustment of block 308.

The method 300 of FIG. 3 illustrates two power output levels for the power adaptor that are switched between based on a temperature determination at block 304. In other embodiments, two or more thresholds may be set to adjust the power output level of the power adaptor between the two power output levels. Although only two power output levels are described in certain embodiments, a power adaptor operating in accordance with embodiments of this disclosure are not limited to two power output levels. In some embodiments, two or more thresholds may be set to adjust the power output level of the power adaptor based on the temperature exceeding certain of the two or more threshold levels. For example, the adjustable power adaptor may have configurable states for 45 Watts, 55 Watts, and 65 Watts, corresponding to three threshold temperatures of 55 degrees Celsius, 75 degrees Celsius, and 105 degrees Celsius.

Figure 4:
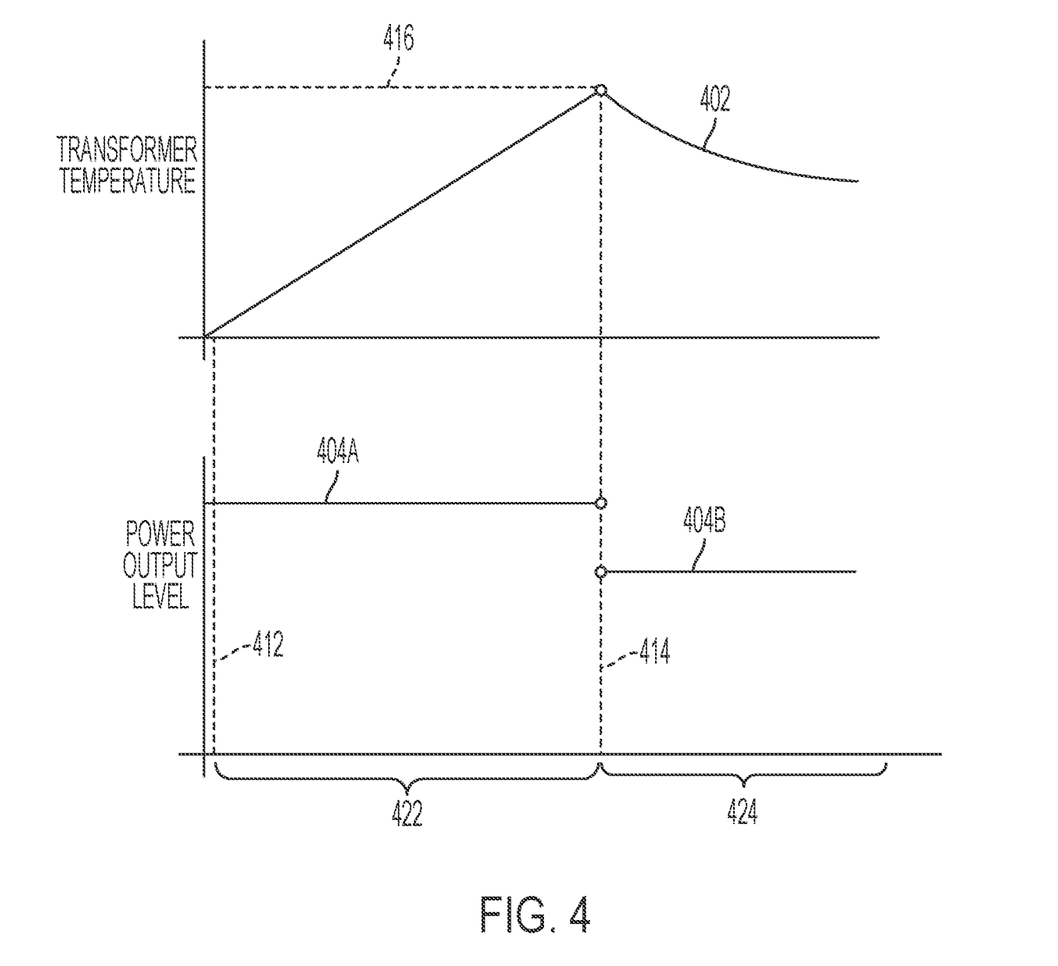
FIG. 4 is a graph illustrating reconfiguration of a power output level of a power adaptor according to some embodiments of the disclosure.

An example illustration of an operation of the power adaptor is described with reference to FIG. 4. FIG. 4 is a graph illustrating reconfiguration of a power output level of a power adaptor according to some embodiments of the disclosure. FIG. 4 illustrates a graph 402 of a transformer temperature of the power adaptor and a graph 404 of a power output level of the power adaptor. Initially in time period 422 beginning at time 412, the transformer temperature is below a threshold temperature 416 and the power output level of the power adaptor is at first power output level 404A. At time 414, the transformer temperature reaches the threshold temperature 416 at which time the power adaptor is reconfigured for second power output level 404B for time period 424. After switching to the second power output level 404B the transformer temperature may begin to decrease after time 414. There may be a timed delay after time 414 before the power adaptor is allowed to return to the first power output level 404A. In some embodiments, the threshold may be different depending on the current state of the power adaptor. For example, when the power adaptor is operating at first power level 404A the threshold may be set to temperature threshold 416, and when the power adaptor is operating at second power level 404B the threshold may be set lower than the temperature threshold 416.

Figure 5:
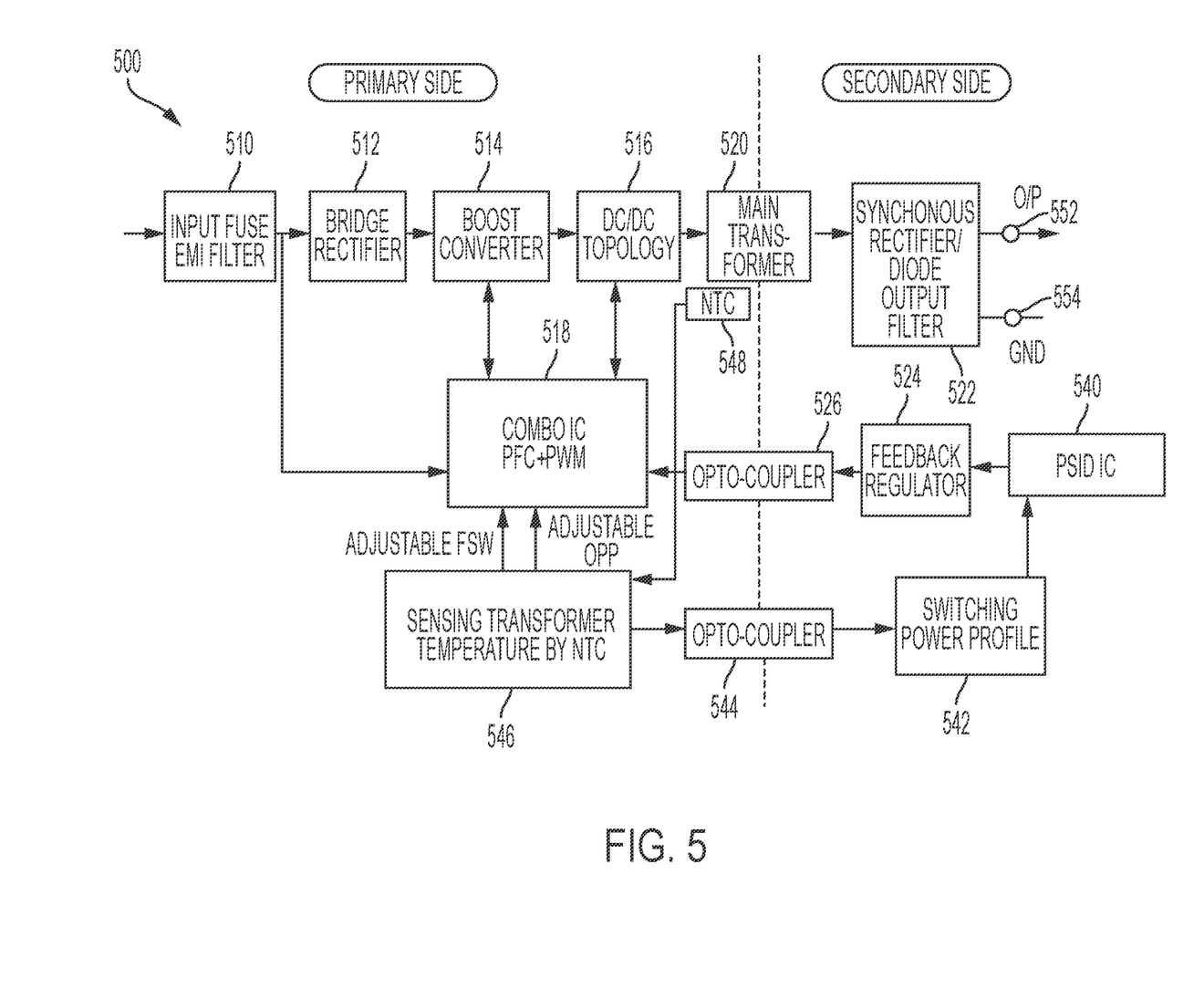
FIG. 5 is a block diagram illustrating a reconfigurable power adaptor according to some embodiments of the disclosure.

A power adaptor capable of reconfiguring to different power output levels is shown in FIG. 5. FIG. 5 is a block diagram illustrating a reconfigurable power adaptor according to some embodiments of the disclosure. A power adaptor 500 may include an input fuse and EMI filter 510 coupled to an alternating current (AC) input to receive AC input power.

The power is then transmitted through a bridge rectifier 512, a boost converter 514, and a DC-to-DC converter 516 to a main transformer 520. The DC-to-DC converter 516 may be, for example, a fly-back converter, a half-bridge converter, a full-bridge converter, or a forward converter. The transformer 520 outputs power to a synchronous rectifier/diode output filter 522, which couples to output power port 552 and ground port 554. The ports 552 and 554 connect to an information handling system to provide operating power. An integrated circuit (IC) 518 may control certain operational aspects of the power adaptor 500. The IC 518 receives feedback from one or more of the boost converter 514 and the DC-to-DC converter 516 to control the boost converter 514 and/or the DC-to-DC converter 516.

The IC 518 may also receive feedback from a temperature controller 546. The temperature controller 546 may provide control signals to the IC 518 based on a measured temperature of the transformer 520. A temperature detector, such as a negative temperature coefficient (NTC) thermistor 548, may be attached to the transformer 520 to measure a temperature of the transformer 520. The temperature controller 546 may provide control signals to the IC 518 to adjust an output power level and/or a switching frequency of the power adaptor 500 based on the determined temperature from the NTC 548. To provide notifications to the information handling system, the temperature controller 546 may be coupled through an opto-coupler 544 to a profile selector 542, which may send a message through the power supply identification (PSID) IC 540. The PSID IC 540 may control the IC 518 through a feedback regulator 524 and an opto-coupler 526 to encode a message regarding the new power supply source capability for transmission over the output power port 552. Transmitting the message through the same output power port 552 that transmits power to the information handling system allows the adjustable power supply the flexibility to operate over conventional connectors and future connectors. Although several ICs are described in FIG. 5, embodiments of the invention may include fewer or more ICs in the power adaptor. For example, IC 546 an IC 518 may be alternatively organized as separate functional blocks within a single IC.

The notification of blocks 308 and 318 of FIG. 3 can be performed by the power adaptor 500 by broadcasting source delivery capability information to the information handling system using, for example, a SDQ protocol of the PSID IC. For barrel connectors a reset ("REST") pin can be reset to alert and rebroadcast source capability to the system when the power adaptor is able to deliver more power to system. The reset/broadcast is repeated when the power adaptor returns to normal power rating or changes to another power rating. With a USB Type-C Power Delivery (PD) connector the change in power level may be communicated via a USB Type-C PD protocol change of PDO.

Figure 6:
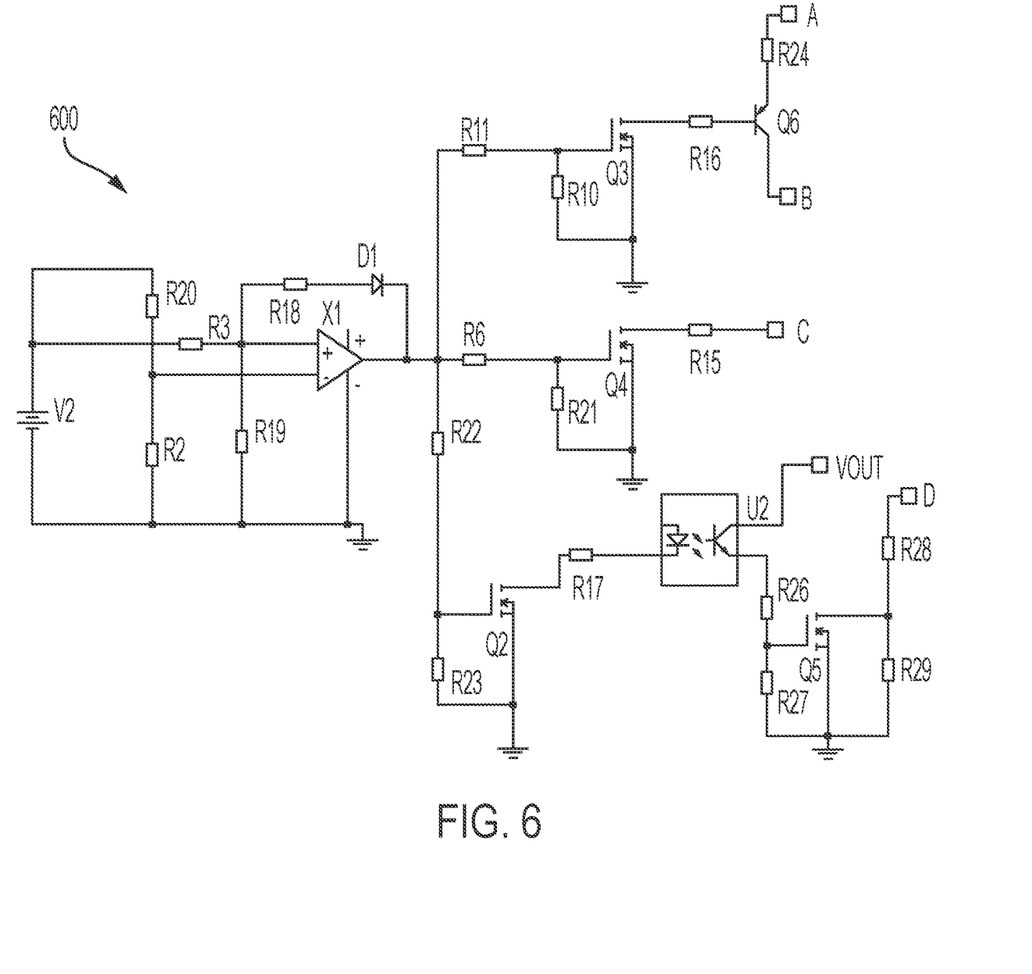
FIG. 6 is a circuit schematic illustrating a reconfigurable power adaptor according to some embodiments of the disclosure.

FIG. 6 is a circuit schematic illustrating a reconfigurable power adaptor according to some embodiments of the disclosure. The power adaptor circuit 600 of FIG. 6 includes a thermal sense, non-inverting comparator with hysteresis. The power adaptor 600 may include an adjustable converter switching frequency $F_{sw}$, an adjustable OPP (over power protection), and switchable power profiles to broadcast to an information handling system. The transformer thermal sense block R20 may be located inside the transformer to accurately represent the transformer core temperature. Comparator X1 may be configured as an OPA non-inverting comparator used to enter and exit the higher power output level mode of operation. The sense block R20 may be attached to the transformer core to provide real-time determination of a temperature inside the transformer. The block R20 impedance will decrease or increase based on transformer temperature variation. The comparator X1 inverting (V−) input receives voltage based on block R20 impedance as divided across the block R20 and block R2. The value of block R2 impedance may be fixed, such that the voltage on the comparator X1 inverting (V−) input will increase or decrease depending on the block R20 impedance, which is proportional to transformer temperature. A reference voltage may be received at the comparator X1 non-inverting (V+) input and may be determined by the corresponding transformer temperature at which the source capability is increased or decreased.

When the voltage on the comparator X1 inverting (V−) input is less than comparator X1 inverting input (V+), the comparator X1 output switches high to turn on MOSFETs Q2, Q3, and Q4. Toggling of these switches triggers three functions: an adjustment of the PWM frequency to a higher frequency, adjustment of the over power protection (OPP) to a higher level, and a switch in the power profile (source capability) to higher power output level. The source capability may be the only communication channel with the information handling system by triggering the power profile circuit to send a series of SDQ protocol messages with the new adaptor source capability. At high power level, the PWM operating frequency may be increased to reduce a delta swing of flux density in the transformer to prevent the transformer from saturating and to support higher power output levels from the power adaptor. The PWM operating frequency value may be determined by R7. Turning on transistors Q3 and Q6 results in a total resistor value being changed by placing R24 and R7 in parallel to increase the PWM operating frequency.

When the voltage on comparator X1 inverting input (V−) is greater than reference voltage on comparator X1 non-inverting input (V+), the comparator X1 output switches low to turn off MOSFETs Q2, Q3 and Q4. This triggers the three functions in reverse: adjusting the PWM frequency to a lower frequency, adjusting the over power protection (OPP) to a lower level, and switching the power profile indicating the source capability to a lower power output level.

The adaptor power output level is changed to allow the power adaptor to deliver additional power to the information handling system without the higher power level being restricted by over power protection (OPP). In the circuit 600, the power adaptor's total power limit is determined by the impedance of block R9. By adjusting the R9 value, the total power limit point may be adjusted. The power adaptor total power limit can be increased by turning MOSFET Q4 on, which couples resistor R15 in parallel with R9 to form a new resistor value to provide over power protection (OPP) corresponding to a higher power level.

The schematic flow chart diagram of FIG. 3 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc include compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. A method, comprising:
    operating a transformer of a power adaptor for an information handling system, the power adaptor having a total power limit of a rated power limit for the power adaptor corresponding to a saturation magnetic flux of the transformer at a rated temperature;
    determining a temperature of the transformer;
    determining whether the temperature is above a second temperature, wherein at the second temperature the saturation magnetic flux of the transformer provides headroom for operating the transformer at a total power limit of a second power limit; and
    when the temperature is below the second temperature:
        adjusting the total power limit of the power adaptor to the second power limit higher than the rated power limit; and
        notifying the information handling system of a new power adaptor source capability related to the second power limit.

2. The method of claim 1, wherein the step of determining the temperature of the power adaptor comprises determining the temperature inside a core of the transformer of the power adaptor.

3. The method of claim 1, wherein the step of adjusting the total power limit of the power adaptor comprises increasing a switching frequency of a converter within the power adaptor.

4. The method of claim 1, wherein adjusting the total power limit of the power adaptor comprises:
    adjusting a pulse width modulation (PWM) frequency to a higher frequency;
    adjusting an over power protection (OPP) level from a first level to a second level, wherein the first level corresponds to the rated power limit and the second level corresponds to the second power limit; and
    switching a power profile of the power adaptor to the new power adaptor source capability related to the second power limit.

5. The method of claim 1, wherein adjusting the total power limit comprises toggling a plurality of switches configured to adjust a first resistance to adjust over power protection (OPP) level to the higher level and to adjust a second resistance within the power adaptor to adjust a pulse width modulation (PWM) frequency.

6. The method of claim 1, wherein notifying the information handling system of the new power adaptor source capability related to the second power limit comprises resetting a reset pin of a connector of the power adaptor.

7. The method of claim 1, further comprising: adjusting the total power limit to the rated power limit after a predetermined first time period after adjusting the total power limit to the second power limit; and waiting a predetermined second time period after the predetermined first time period before adjusting the total power limit to the second power limit.

8. An apparatus, comprising:
a controller configured to perform steps comprising:
operating a transformer of a power adaptor for an information handling system, the power adaptor having a total power limit of a rated power limit for the power adaptor corresponding to a saturation magnetic flux of the transformer at a rated temperature;
determining a temperature of the transformer;
determining whether the temperature is above a second temperature, wherein at the second temperature the saturation magnetic flux of the transformer provides headroom for operating the transformer at a total power limit of a second power limit; and
when the temperature is below the second temperature:
adjusting the total power limit of the power adaptor to the second power limit higher than the rated power limit corresponding to the total power limit when the temperature is above the predetermined threshold; and
notifying the information handling system of a new power adaptor source capability related to the second power limit.

9. The apparatus of claim 8, wherein the controller is configured to determine the temperature of the power adaptor by determining the temperature inside a core of the transformer of the power adaptor.

10. The apparatus of claim 8, wherein the controller is configured to adjust the total power limit of the power adaptor by increasing a switching frequency of a converter within the power adaptor.

11. The apparatus of claim 8, wherein the controller is configured to adjust the total power limit of the power adaptor by toggling a first transistor that adjusts a first resistance at an output of the power adaptor to adjust over power protection for the power adaptor; and by toggling a second transistor that adjusts a second resistance to adjust a switching frequency in the power adaptor.

12. An apparatus, comprising:
an alternating current (AC)-to-direct current (DC) converting device comprising a transformer, a boost converter, and a DC-to-DC converter;
a temperature detector attached to the transformer and configured to measure a temperature in the transformer; and
a controller coupled to the AC-to-DC converting device and to the temperature detector, wherein the controller is configured to adjust a total power limit of the AC-to-DC converting device based, at least in part, on the temperature in the transformer, wherein the controller is configured to perform steps comprising:
operating the transformer with a total power limit of a rated power limit corresponding to a saturation magnetic flux of the transformer at a rated temperature;
determining, based on the temperature detector, a temperature of the transformer;
determining whether the temperature is above a second temperature, wherein at the second temperature the saturation magnetic flux of the transformer provides headroom for operating the transformer at a total power limit of a second power limit; and
when the temperature is below the second temperature:
adjusting the total power limit of the power adaptor to the second power limit higher than the rated power limit corresponding to the total power limit when the temperature is above the predetermined threshold; and
notifying the information handling system of a new power adaptor source capability related to the second power limit.

13. The apparatus of claim 12, further comprising an output port, wherein the controller is configured to notify an information handling system coupled to the apparatus through the output port of a new power adaptor source capability related to a first total power limit.

14. The apparatus of claim 12, wherein the temperature detector comprises a negative temperature coefficient (NTC) thermistor.

15. The apparatus of claim 12, wherein the controller is configured to adjust the total power limit of a power adaptor by increasing a switching frequency of the DC-to-DC converter.

16. The apparatus of claim 12, wherein the AC-to-DC converting device comprises a first transistor, a first resistance, a second transistor, and a second resistance, and wherein the controller is configured to adjust the total power limit of a power adaptor by toggling the first transistor that adjusts the first resistance at an output of the power adaptor to adjust over power protection for the power adaptor; and by toggling the second transistor that adjusts the second resistance to adjust a switching frequency in the power adaptor.

* * * * *